Dec. 9, 1930.         L. L. JONES         1,784,358
LINE CONTROL FOR CAN MAKING MACHINERY
Filed Sept. 25, 1925          8 Sheets-Sheet 1

Inventor:
Lyman L. Jones
By Munday, Clarke, Carpenter
Attys.

Dec. 9, 1930.   L. L. JONES   1,784,358
LINE CONTROL FOR CAN MAKING MACHINERY
Filed Sept. 25, 1925   8 Sheets-Sheet 2
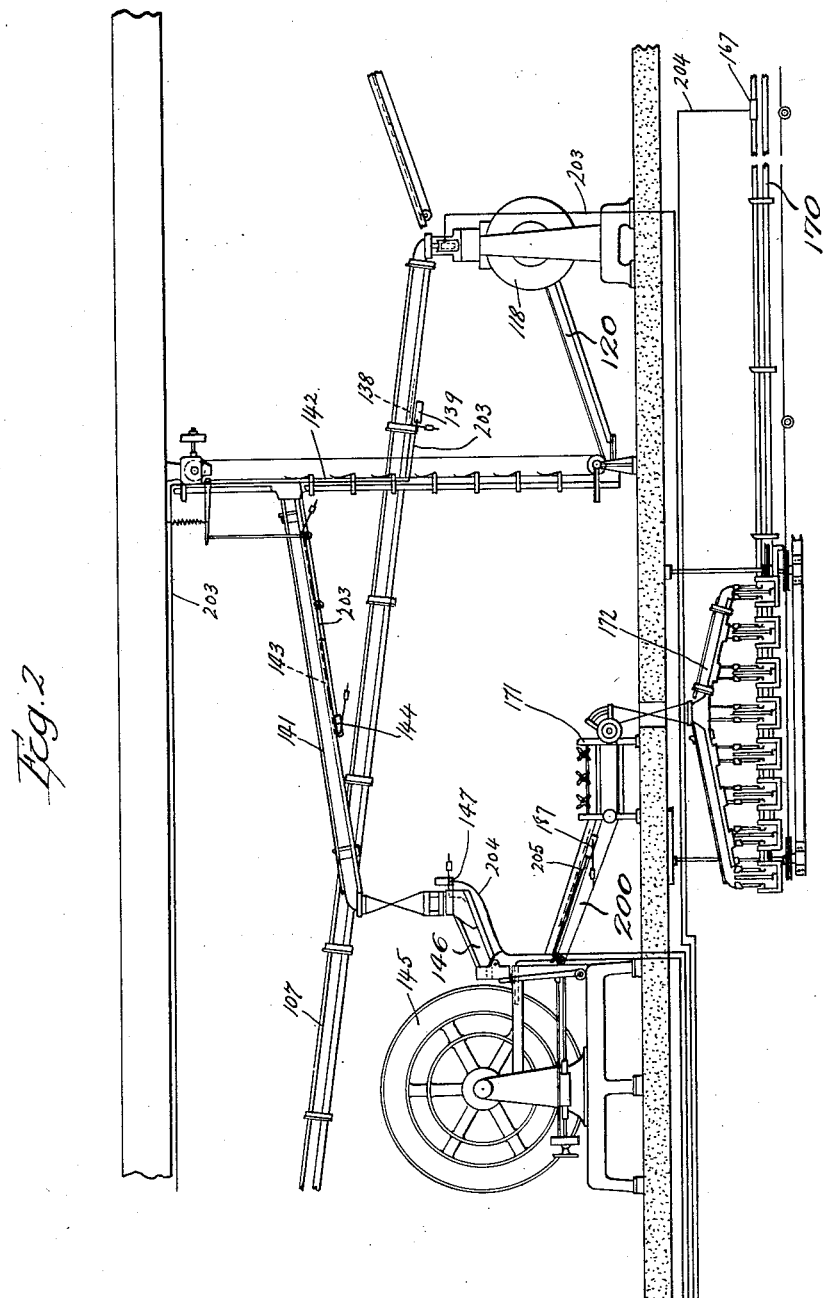

Dec. 9, 1930.  L. L. JONES  1,784,358
LINE CONTROL FOR CAN MAKING MACHINERY
Filed Sept. 25, 1925  8 Sheets-Sheet 3
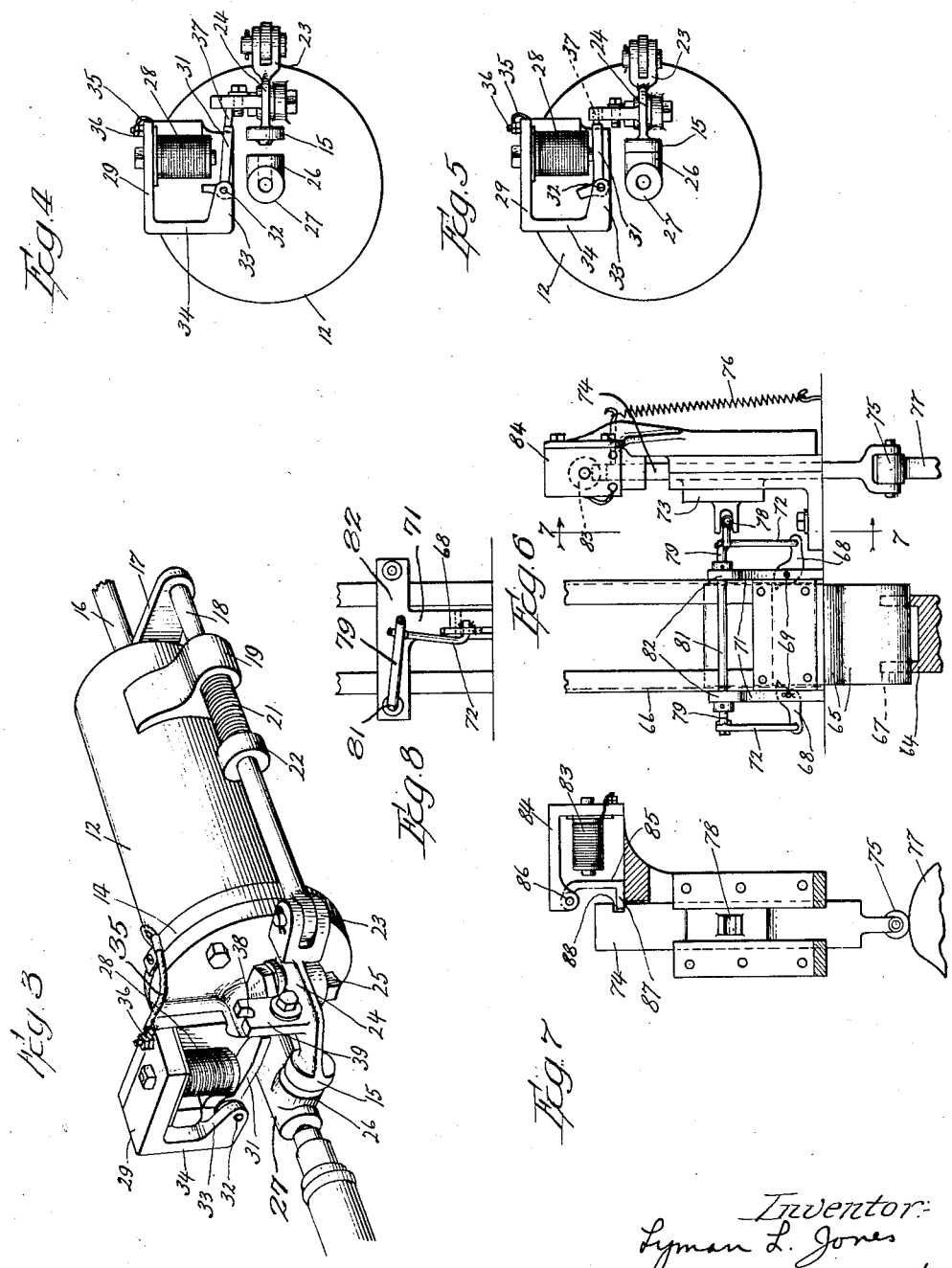

Dec. 9, 1930.                L. L. JONES                1,784,358
                LINE CONTROL FOR CAN MAKING MACHINERY
                    Filed Sept. 25, 1925        8 Sheets-Sheet 4
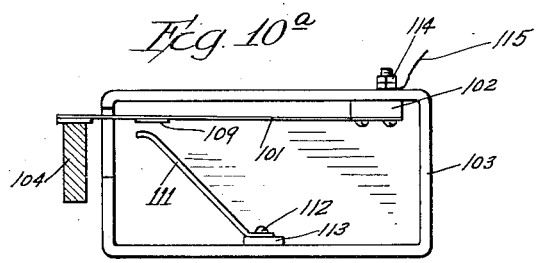
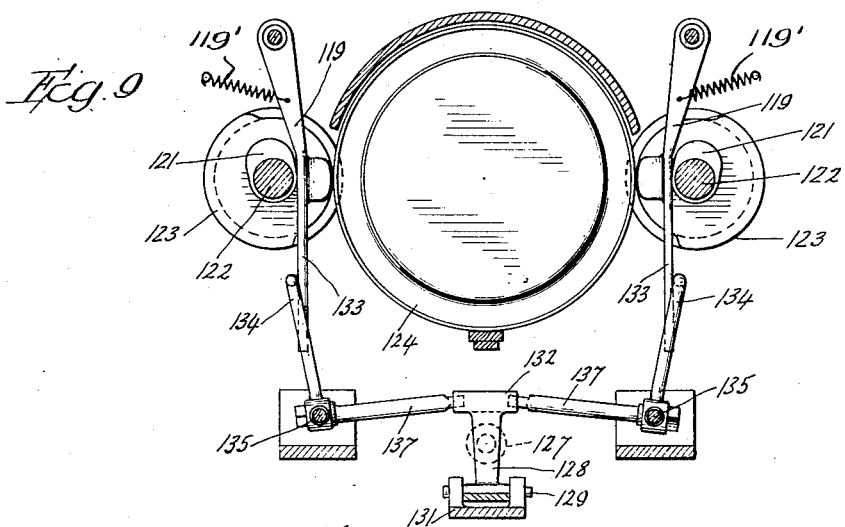
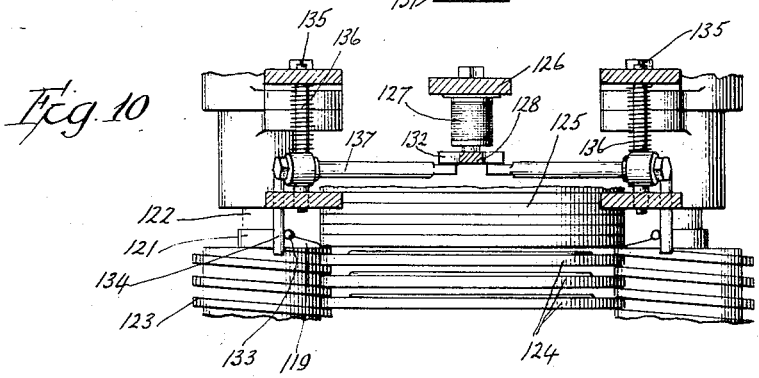

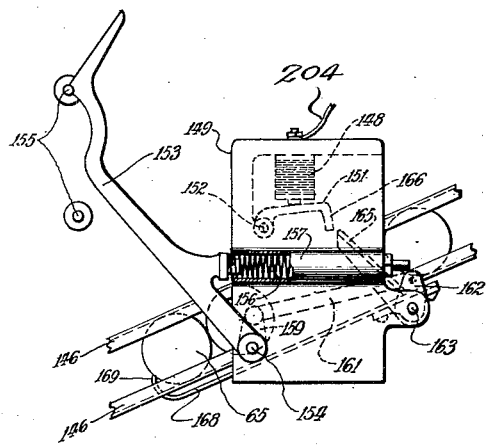

Dec. 9, 1930.  L. L. JONES  1,784,358
LINE CONTROL FOR CAN MAKING MACHINERY
Filed Sept. 25, 1925  8 Sheets-Sheet 6

Inventor:
Lyman L. Jones
By Munday, Clarke & Carpenter
Attys.

Dec. 9, 1930.  L. L. JONES  1,784,358
LINE CONTROL FOR CAN MAKING MACHINERY
Filed Sept. 25, 1925   8 Sheets-Sheet 7
Fig. 15
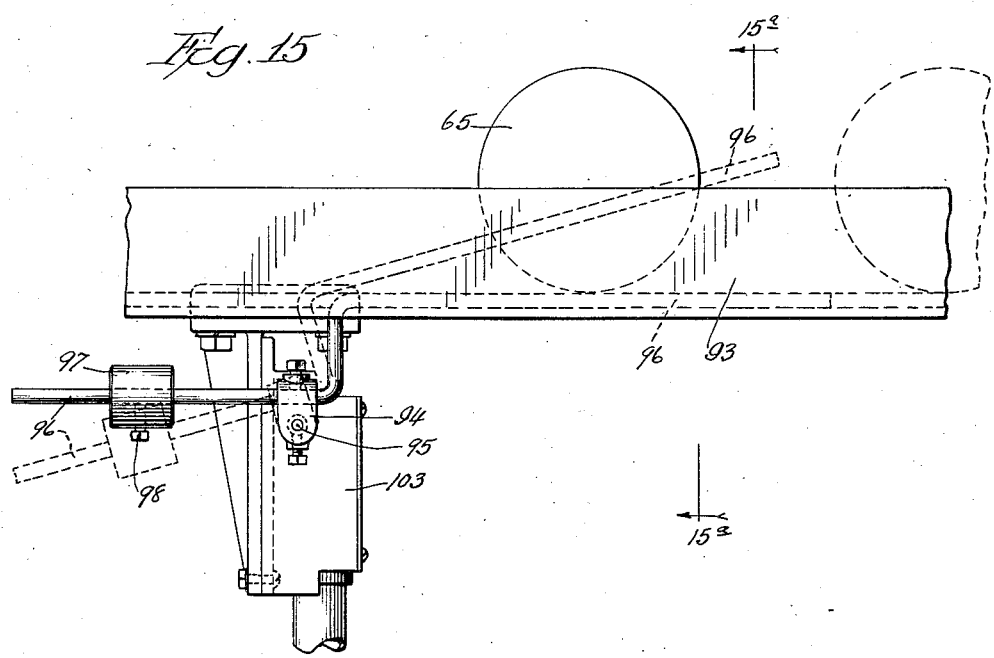
Fig. 15ᵃ
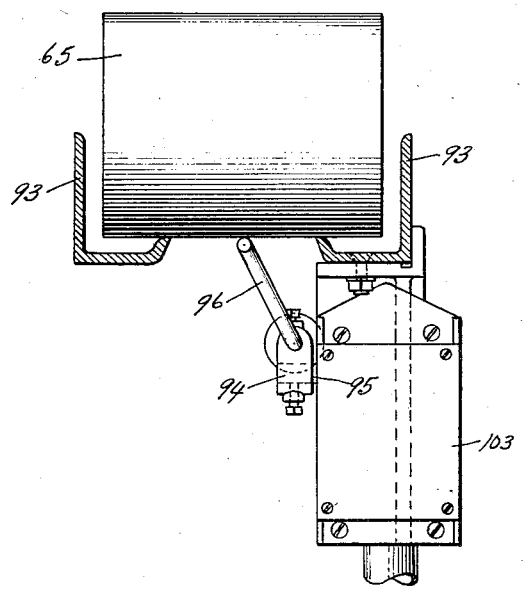
Inventor:
Lyman L. Jones
By Munday, Clarke & Carpenter
Attys.

Dec. 9, 1930. L. L. JONES 1,784,358
LINE CONTROL FOR CAN MAKING MACHINERY
Filed Sept. 25, 1925 8 Sheets-Sheet 8
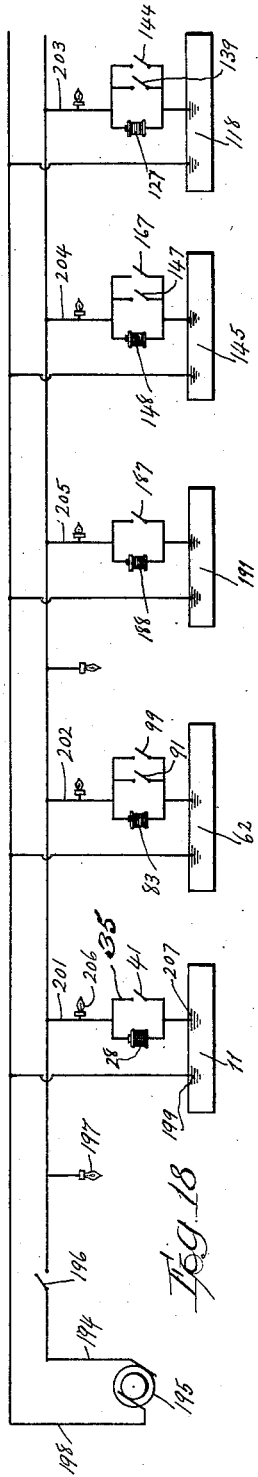
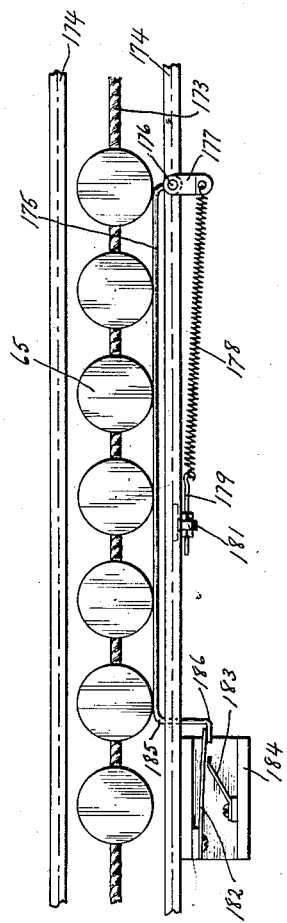
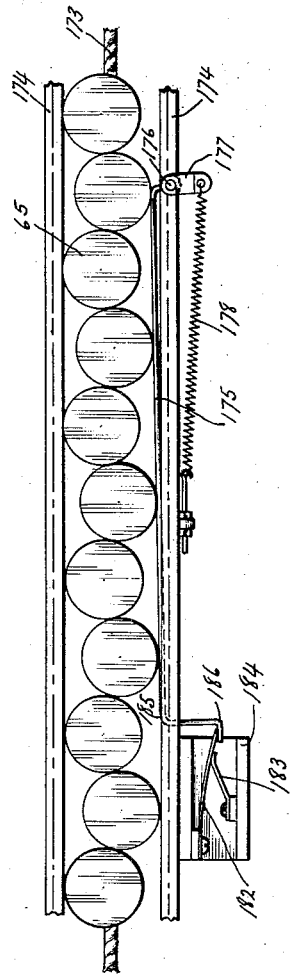
Inventor:
Lyman L. Jones
By: Munday, Clarke & Carpenter
Attys.

Patented Dec. 9, 1930

1,784,358

UNITED STATES PATENT OFFICE

LYMAN L. JONES, OF SEATTLE, WASHINGTON, ASSIGNOR TO AMERICAN CAN COMPANY, OF NEW YORK, N. Y., A CORPORATION OF NEW JERSEY

LINE CONTROL FOR CAN-MAKING MACHINERY

Application filed September 25, 1925. Serial No. 58,562.

This invention relates in general to can making machinery and apparatus and while it has more particular reference to such machinery and apparatus arranged in associated relation for the production of finished cans through synchronized automatic action of such machinery, it will be readily manifest that the invention has valuable application in other connections and also when employed in the operation of dissociated machines.

The principal object of the invention is the provision of an electric, fully automatic control adapted for use either with a line of machines operating successively upon articles which pass through the various machines or for use with single machines and which will insure maximum production, the while fully protecting each machine and device involved against injury.

Another and highly important object of the invention is a control of the character set forth which will automatically stop any and/or all of the machines involved upon establishment of adverse conditions in said machines in the equipment supplying subject cans or articles to said machines and in the mechanism or devices through or by reason of which the cans or subject articles are removed from each machine involved after operation thereon, and all this with minimum interruption to the operation of each of the units of the line. In this regard, my invention contemplates the provision of a control employing electric contacts so arranged as to cause a machine unit in the line to be started into operation automatically and in synchronism with the starting of a second unit and without waiting for the transfer devices to clear.

The invention contemplates both the starting and the stopping of the operation of the various units controlled individually to insure correct operating conditions in the starting and the elimination of all needless interruption to the individual use. In accordance with the invention, no unit is stopped until some condition, either before or behind it, renders further operation at the moment either dangerous to product or machine or needless to maximum synchronized speed of the line.

The invention further contemplates the construction and arrangement of the control to permit the operator to purposely halt the operation of a machine or stop its moving parts for the making of repair or readjustment, etc., with minimum interruption of operation of the line or of the automatic resumption of the speediest possible synchronized action when the machine thus stopped by the operator is again started into action. The invention contemplates also the provision of a control for the entire line which will relieve the operator of the necessity of stopping any machine of the line other than the one he desires to stop for the purpose of repair, readjustment, etc., the control itself taking care of the operating condition of the other machines in the line as created by the stopping of the particular one.

A further object of the invention is the provision of such a control adapted to function for the accomplishment of the foregoing purposes by halting as an incident to its controlling action a minimum number of the normally continuously moving parts in the various machines or units controlled. The various units are controlled in accordance with the preferred embodiment of the invention by merely interrupting the feed to them individually of the article upon which they are to operate. The runways between the individual units are preferably constructed and arranged to contain for either transfer or storage the articles already in the individual machine at the time its feed of additional articles is interrupted. The arrangement moreover is such that under any normal operation of the control in interrupting the full activity of the line a number of can bodies or other articles is automatically stored for delivery to each non-operating machine immediately upon reestablishment of operating conditions and to thereafter provide for continued normal speed production, preceding machines supplying subject articles before the storage supply is exhausted.

Another important object of the invention is the provision of a control which will insure proper feeding conditions to the units of the line after interruption of operation.

In the manufacture of can bodies certain units, as for example, the flanger, tester, etc., require a considerable number of can bodies in the runway or guide immediately delivering into the unit to insure accurate, quick placement of the can body in the presented turret pocket and my invention therefore contemplates the delay of the feeding to such machine or machines until the desired number of can bodies is arranged in storage and in position to insure prompt entry of the presented body into the turret pocket.

Another important object of the invention is the provision of a control of the character described employing a minimum of mechanical devices and particularly constructed and arranged to require a minimum number of delicate parts or parts which will require frequent repair, replacement or adjustment.

Numerous other objects and advantages of the invention will be apparent from the following description, which, taken in connection with the accompanying drawings, discloses a preferred embodiment thereof.

Referring to the drawings:

Figures 1 and 2 are diagrammatic views which, taken together, indicate in outline a line of can making machinery with connecting runways and elevators and the controls in which my invention is embodied;

Fig. 3 is a perspective view of the vacuum pump of the bodymaker and the magnet unit for automatically controlling the feeding of blanks;

Figs. 4 and 5 are end elevations of said pump and magnet unit, showing, respectively, the open and closed positions of the release valve;

Fig. 6 is a front elevation of the feed control end magnet unit for the flanger;

Fig. 7 is a section and elevational view, taken substantially on the section line 7—7 in Fig. 6;

Fig. 8 is an elevational view, partially broken away, of the means for holding the cans from entering the flanger;

Fig. 9 is a bottom view, partially in plan and partially in section, of the end feed control and magnet unit for the double seamer;

Fig. 10 is a front elevational view thereof;

Figure 14:
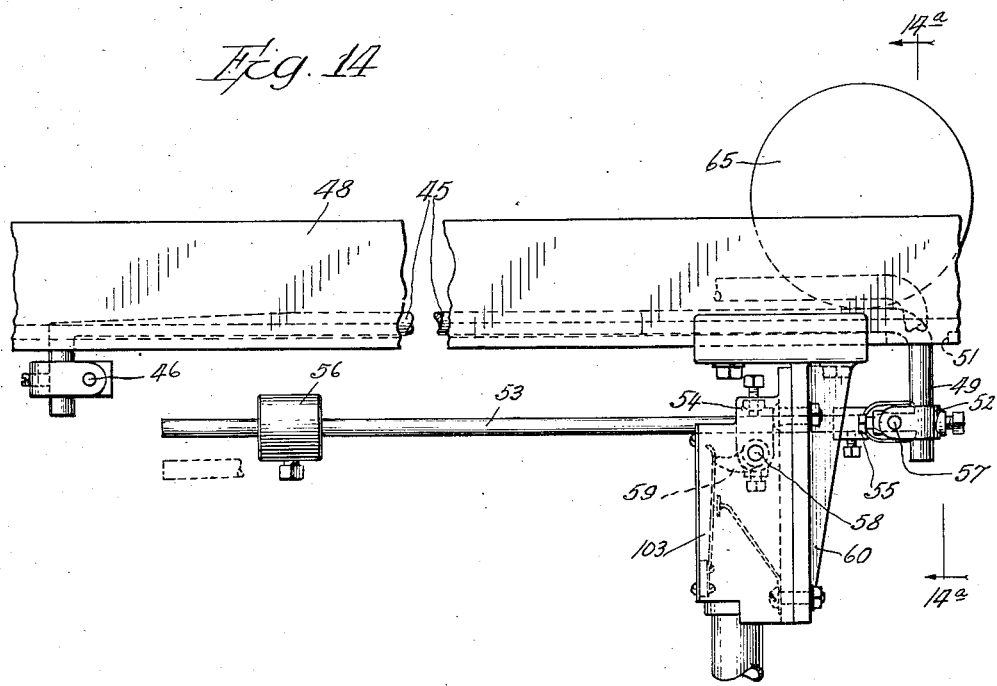
Figure 14A:
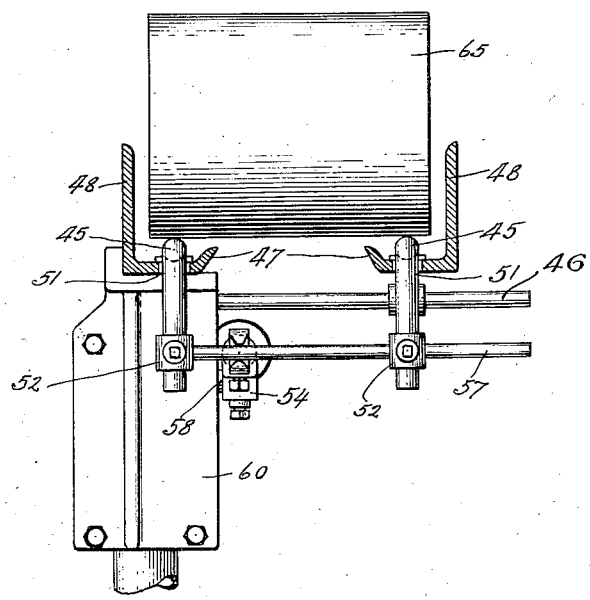

Fig. 10ª is an elevational view of a contact unit, showing a portion of the operating means therefor at the flanger elevator;

Fig. 11 is a view, partially in section and partially in elevation, of the feed control and magnet unit at the tester;

Fig. 12 is a plan and sectional view thereof;

Fig. 13 is a perspective view of the starting lever and magnet control for the tester;

Fig. 14 is an elevational view of one of the double balance beams, the contact controlled thereby being diagrammatically shown;

Fig. 14ª is a sectional view taken substantially on line 14ª—14ª in Fig. 14;

Fig. 15 is a view similar to Fig. 14 of one of the single balance beams;

Fig. 15ª is a sectional view taken substantially on line 15ª—15ª in Fig. 15.

Figs. 16 and 17 are plan views of a cable balance beam and associated contact, and Fig. 18 is a typical wiring diagram of the system.

*General description of can line*

Figure 1:
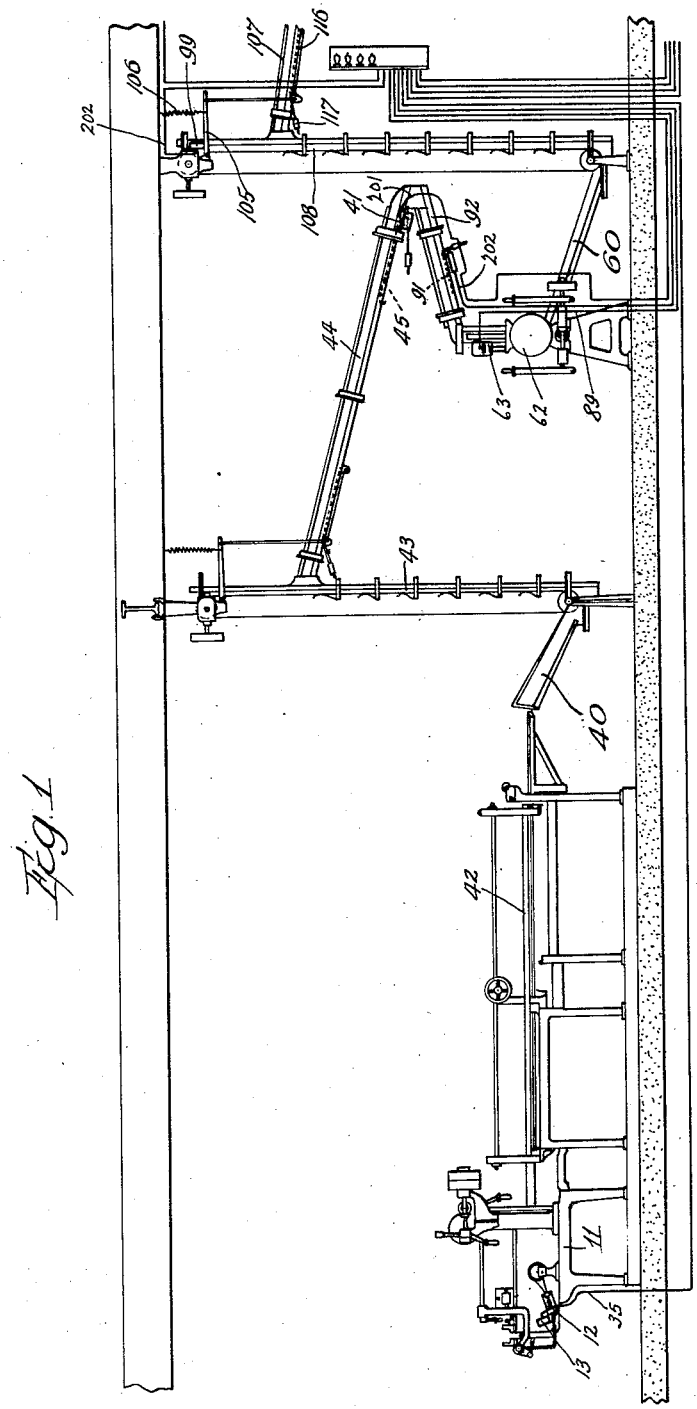

Referring first to Figs. 1 and 2, a general description of a can making line will be first undertaken. In the manufacture of cans, flat body blanks of suitable dimension are stacked at the feed end of the bodymaker. This machine is schematically illustrated at 11 in Fig. 1. These blanks are individually removed by a suction cup or head from the bottom of the stack. The suction cup is arranged upon an oscillating arm which moves in timed relation with the feeding devices of the bodymaker which progressively advance the blanks in processional order to and past the various successively operating body making instrumentalities, which first notch the edges, then bend them to hooked form for interengagement, thereafter bending the blanks to the form of body desired, engaging the edges and finally compressing them.

From the bodymaker, the cans are delivered directly to a side seam soldering machine or mechanism, indicated generally on the drawing by reference character 42, which, from certain aspects of the invention, may be considered a part of the bodymaker. In the side seam soldering machine, the can bodies pass across devices which apply solder throughout the length of the can seam. From the side seam soldering machine, the can bodies roll down an inclined chute or runway 40 to the bottom of a vertically arranged elevator 43, at or near the top of which they are delivered to the upper end of a downwardly inclined zig-zag runway which delivers them to the flanger, generally indicated at 62. This runway, in the present instance, comprises an upper runway leg 44 and a lower runway leg 92.

The flanger 62 bends each end of the can body outwardly into a flange adapted to be later interfolded with the can end periphery to form the double seam.

The flanged bodies leave the flanger and pass down an inclined runway 60 to the bottom of a second vertically extending elevator 108, which carries the can bodies 65 upwardly and to the top of a relatively long, downwardly inclined runway 107 leading to the double seamer 118 which attaches and seams one end to the can body. From the double seamer 118, the cans which are now completed move down a runway 120 to the bottom of a third elevator 142.

The elevator 142 delivers the can bodies to a runway consisting of the two inclined legs 141 and 146, which conveys them to the tester 145. In the tester, the can bodies are received upon and carried around by testing mechanism located upon the periphery of the tester wheel. After testing, the can bodies move down an inclined runway 200, through a counting device 171 and into a storage distributor 172. The storage distributor delivers them, or may deliver them, to a disposal runway or transfer means 167.

General description of electric line control

An electric control for the can line is provided which synchronizes the various units of associated machines and mechanisms for maximum output, this control being designed to provide minimum interruption or stoppage of a minimum number of machine units upon establishment of adverse conditions anywhere in the combined apparatus. The control in the present embodiment of the invention affects, in the main, merely the feed of the subject articles or can parts or elements to the separate units forming the can making line and is governed by the condition in the elevators, runways, guides, etc., that together form the transfer devices between the units of the line. The moving parts of the various machine units continue their action without interruption subject, of course, to their individual protective controls, where such are provided, and to stoppage by the operator as he may deem desirable.

Upon interruption of the feed of subject articles into any of the units of the line, the parts previously fed in proceed through the unit, which performs its operation or operations upon them. The transfer devices and the control are so constructed and arranged as to permit delivery of the can elements or body parts out of such unit without interference with the operation of other units or undue congestion in the transfer and conveying devices. After a unit to which further feeding has been stopped has completed its operation, it runs idly until feeding is again resumed.

Certain units of the line require a storage of can parts or bodies at the feeding station to insure accurate, efficient operation. Examples of such units are the flanger, the double seamer and the can tester. In these machines, the bodies are received into pockets of rotating turrets and wheels and it is desirable that the received cans be pressed into the pockets. The control embodying this invention, and now being described, contemplates the storage at the feeding stations to the flanger, double seamer and tester of a sufficient number of cans to provide this needed pressure. Accordingly, the feed is interrupted by the control until, or unless, the needed number of cans is in storage for presentation to the pockets of these machine units.

Control of the bodymaker

The feeding of the blanks to the operative stations of the bodymaker or bodymaker mechanism is interrupted by the control only when a surplus of can bodies is accumulated in the zig-zag runway between the soldering machine 42 and the flanger 62. This interruption is accomplished by the crowding of cans in the zig-zag conveyor between the bodymaker and flanger to and at the point 41 in Fig. 1, as will be presently described. Cans accumulating to this point cause interruption of the suction feed of the blanks. When the flanger has operated upon a sufficient number of cans to reduce such accumulation, operation of the suction feed resumes and the blanks again pass into and through the bodymaker.

Referring now more particularly to Figs. 1 and 3 to 5 inclusive, it will be noted that a magnet coil 13 is mounted upon the head 14 of a vacuum pump 12 and is adapted to automatically control a release valve 15 to prevent operation of the suction feed when can bodies have accumulated past the point 41 of the zig-zag conveyor between the bodymaker and the flanger. Said pump contains a piston (not shown) reciprocated by a rod 16 in timed relation with the operative mechanism of the bodymaker. The rod 16 at one end of its stroke causes the piston to act upon an arm 17 fixed upon a rod 18 which is arranged through a bearing 19 extending out from a side of the pump. The rod 18 is connected to an arm 23 of a bell crank 24 pivoted at 25 to the head 14 of the vacuum pump. A collar 22 is fixed upon the rod 18 between the bearing 19 and the pivotal connection between the rod and bell crank, and a spring 21 is arranged upon the rod between the collar 22 and the bearing 19 to cause the rod to press the arm toward the end of the cylinder 12. The bell crank 24 carries the release valve 15 and this valve co-acts with an apertured extension 26 of a conduit 27 leading from the suction pump to the feeding mechanism of the bodymaker. The spring normally holds the valve closed and the piston opens it near the end of each stroke.

The magnet unit above referred to comprises a coil 28 supported by a bracket 29 and controlling an armature 31 pivoted at 32 to inwardly extending ears 33 on a downward extension 34 of said bracket. Current is supplied to the magnet coil 28 through a wire 35 leading to a binding post 36 and while said coil is energized, the armature is held in a raised position, i. e., the position shown in Fig. 5. In this position, a tip 37 on the armature is arranged to pass into and out of a slot 38 in an upstanding lug 39 carried by the bell crank 24, thus permitting free movement of the bell crank and the normal feeding of blanks to the bodymaker. When, however, the coil is deenergized, as occurs when the feed to the bodymaker is to be interrupted, the armature drops to the position shown in Figs. 3 and 4 of the drawing. In this position, the tip 37 of the armature is arranged below the slot 38 of the lug 39 and the valve is held in open position, thus preventing operation of the suction feed without stopping movement of other parts of the bodymaker and soldering machine. Upon each reciprocation of the rod 16, the pressure of the lug 39 against the tip of the armature produced by the spring 21 is relieved and said armature is free to be raised when the coil 28 has been again energized.

Current is supplied to magnet coil 28, as will now be described. Referring to Fig. 18, reference character 195 indicates a generator or other suitable source of electrical energy, wires 194 and 198 leading from its poles. Wire 198 is grounded at 199 to the bodymaker. Wire 194 leads through a switch 196 and a lamp 197 to the various magnets employed in the electric control. Wire 201, through a lamp 206, connects wire 194 to one side of magnet coil 28. The other side of the magnet coil is grounded to the bodymaker, as indicated at 207.

The double balance beam construction is illustrated in detail in Figs. 14 and 14ª of the drawings and comprises one or more rods 45 which may be pivoted in any suitable manner, as at 46, to a bottom flange 47 of an angle iron guide 48. The forward end 49 of the rod or rods 45 is formed to extend downwardly through an aperture 51 in the angle iron guides, and a bracket 52 is, or may be secured thereto by a set screw, or the like. The rod 45 is normally held in raised position by means of a sensitive balance beam comprising a rod 53 having a bearing in a pivoted bracket 54, a forked bracket 55 being secured to one end of the rod 53 and a balance weight 56 secured to the other end. The forked bracket 55 is preferably formed to engage a rod or shaft 57 which may extend through and be carried by one or more brackets 52. The weight 56 is adapted to normally hold the rod 45 in a raised position and is preferably adjustable along the rod 53, as shown. The pivoted bracket 54 is secured to a shaft 58 having bearings in a housing or box 103 of a standard contact unit, such as that illustrated in Fig. 10ª of the drawings, or any other suitable switch housing. The housing 103 may be secured to the guide or guides 48 in any suitable manner, such as by a bracket 60. A cam 59 may be secured to the shaft 58 within the housing for actuating suitable contact members, such as shown in Fig. 10ª. This type of balance beam is adapted to be used in a can runway in which the cans are rolled by gravity and when said cans crowd in the runway, the rod or rods 45 are depressed by reason of the added weight of a greater number of cans, and through the rod 53, the pivoted bracket 54, the shaft 58 and the cam 59 move a suitable contact member to close the circuit in which the control or shunt device is connected. When a switch of the type shown in Fig. 10ª is used, one of the contact members is grounded to the machine and the other insulated therefrom and connected by a wire or other conductor between the lamp and magnet unit, this wire, in the case of the bodymaker, being indicated by the reference character 35. Adjustment for cans of different height is facilitated by the connection of the bracket 52 to the downwardly extending portion 49 of the rod or rods 45. This bracket is preferably freely slidable on the rod and secured in various positions by a set screw, as previously described. In a runway that is not normally filled with cans, said rods should be of considerable length to insure their working well, but in a runway that is normally full of cans, short rods may be used or a single beam if desired. From the foregoing, it will be evident that crowding of the cans in the runway 44 will operate the balance beam and contact unit at 41 and thereby interrupt the current normally flowing to the magnet coil 28, the control or shunt circuit being grounded through the closing of the contacts. The can bodies 65 in the bodymaker will continue to flow after the feed of blanks thereto has been stopped until the machine is empty. As soon as the supply of can bodies behind the flanger diminishes to below the point 41, the contacts are opened, breaking the shunt, and again supplying current to the magnet coil 28. This lifts the armature 31 and blanks are fed from the stack into the bodymaker.

*Control of the flanger*

The feeding of the formed bodies to the flanger or flanger mechanism is interrupted under two different conditions, one of which is an insufficient number of cans in the runway leg 92 and the other of which is a too great number of cans in the runway 107 to the double seamer. The first of these conditions is important because the can bodies are received into pockets of a continuously rotating turret and unless the presented body is firmly pressed into the pocket by the weight of cans behind it, there is danger that it may bounce and be caught and jammed as the pocket passes. The second of the conditions is important in order that a limit may be placed upon the number of cans contained in the transfer means to the double seamer so that jamming may not occur and space be left for delivery of the cans in the flanger pockets at the time of interruption of the feed to the flanger.

Referring now to Figs. 6 to 8 inclusive, it will be observed that I have shown a fragment of the flanger turret at 64, the can bodies 65 being fed down into its pockets 67 through a vertical chute 66 which receives them from the runway leg 92. The feeding of the can bodies into the pocket is in timed relation with the rotation of the turret. The timing mechanism accomplishing this comprises levers 68, pivoted at 69 to frame parts 71, and adapted to be moved inwardly toward each other by hook members 72 which have a vertical reciprocating movement imparted by a sliding block 73 carried upon a slide 74. The slide 74 is suitably guided in the frame of the machine and is provided at its lower end with a roller 75 which rides upon a cam 77 in the flanger mechanism. A spring 76 causes the slide to follow the cam surface, as may be seen in Fig. 6. The block 73 has a pivotal sliding connection with an extension 78 of one of a pair of rocker arms 79 which are formed on opposite ends of a rock shaft 81 arranged in fixed bearings 82 secured to the frame parts 71. The rocker arms 79 are pivotally connected to the members 72 already mentioned. In the normal operation of the flanger, the levers 68 are swung out from the position shown in Fig. 6 as each turret pocket is presented, and as the turret continues its rotation a can body is deposited in the pocket. The levers 68 are swung back into the position shown in Fig. 6 and into the inside of the next-presented can, holding it until the presentation of the next pocket.

When, however, either of the adverse conditions above described is presented, a mechanism controlled in accordance with said condition prevents retraction of the levers 68 to permit feeding of the can body into the pocket. This mechanism comprises a magnet unit which includes a coil 83 mounted in a bracket 84 and controlling an armature 85 pivoted at 86 in said bracket. The armature 85 is provided with a hook 87 at its lower or free end and the slide 74 is notched at 88 for engagement by the hook 87 when the coil 83 is deenergized, the armature being pivoted in such manner as to fall over into engagement with a side of the slide when the current to the coil is short-circuited or interrupted. The slide 74, when engaged by the hook 87, is held up against the force of the spring 76 so that its roller 75 does not follow the contour of the cam. The slide is held up in a position $\frac{1}{32}$ of an inch or more beneath the top of its stroke, so that each high point of the cam lifts it off the hook and permits ready retraction of the armature upon reestablishment of flow of current through the coil.

The circuit for short-circuiting the magnet coil 83 includes contacts at 91 in the runway leg 92 for insuring an adequate supply of can bodies 65 behind the flanger and contacts at 99 for preventing overcrowding or oversupply of can bodies 65 in the transfer runway 107, these two sets of contacts being arranged in parallel, as may be observed in Fig. 18.

Referring to this figure, current is normally supplied to the magnet coil 83 from the source of electrical energy 195, through wire 194, switch 196, lamp 197 and wire 202 to coil 83, thence to ground and back through ground and wire 198 to source of energy. Closing of either of contacts 91 or 99 short circuits the magnet coil, as will be readily understood, the wiring being similar to that already described in connection with the circuit for the bodymaker control. The mechanical construction of the contact units will now be described. A single balance beam is located at the point 91 and its construction and arrangement are shown in Figs. 15 and 15ª. It comprises a bracket 92 secured to the under side of the angle irons or runway 93 to which a switch housing of the type shown in Fig. 10ª of the drawings may be secured. A pivoted bracket 94 and shaft 95 having bearings in the housing 103 and of the type and character shown and described in connection with the double balance beam are, or may be used to close the circuit, as previously described. A rod 96 having a bearing in the pivoted bracket 94 is formed on one side of the pivoted bracket to extend within the runway and in position to be engaged by cans passing therethrough, and the opposite end of the rod 96 is extended to receive a weight 97 which may be secured thereto at various distances from the pivoted bracket by a set screw 98. The weight 97 tends to move the rod 96 towards an elevated position, as shown in the dotted line position indicated in Fig. 15, and when the rod is in this position, contact is made within the switch housing 103. As in the case of the contact unit at 41, one of the contacts is grounded and the other connected with the wire between the generator, or rather the lamp connected with the generator, and the magnet unit to be controlled. It will thus be evident that when the can bodies in the runway run low, the coil 83 of said magnet will be shorted and the feeding in of the cans terminated, in the manner hereinbefore described, with six or eight cans left in said runway.

The second contact unit associated with the feed control of the flanger is indicated at 99 in Fig. 1 of the drawings and is shown more particularly in Fig. 10ª. The contacts of said unit are mounted in a manner which may be the standard construction above referred to, it being, of course, apparent that modifications of the operating means may be employed to suit particular conditions. A flat spring 101 is secured to an insulating block 102 in the top of the box 103 and is normally held in a spring-flexed position by means of a support 104, connected with a lever 105 (see Fig. 1), held in raised position by means of a spring 106 and adapted to be operated by can bodies 65 crowding in the runway 107. Said spring 101 carries a contact 109 adapted to engage a round spring 111, secured at 112 to an insulating block 113 in the bottom of the box 103. The construction is such that when the lever 105 and support 104 are moved downwardly, the contact 109 is moved by the tension of the spring 101 into contact with the spring 111, preferably producing a sliding action, which tends to keep the contacts clean and bright. A binding post 114 is provided at the top of the box 103 and connected by wiring 115 with the source of current, one of the contacts being connected with the wire leading to the magnet unit 63 and the other being grounded in the manner hereinbefore described. In the event that the can bodies crowd in the runway section 107, a rod 116 is moved downwardly against a weight 117 pulling the lever 105 down against the tension of the spring 106 and making the contact 109, 111 to short the magnet at 63 and prevent further feeding of can bodies into the flanger until the runway is clear.

*Control of double seamer*

The control shown on the drawing and demonstrating the preferred embodiment of the invention is adapted to prevent feeding of can bodies to the double seamer or double seaming mechanism under two different sets of adverse conditions. One of these is an insufficient number of cans awaiting feeding into the double seamer, and the other is a too great accumulation in the transfer devices between the double seamer and tester.

It will be understood that the function of the double seamer is to unite a can end to each can body, and accordingly a can body and a can end must be conjointly fed to each seaming organization. In the preferred embodiment of the invention shown on the drawings, it is contemplated that the double seamer is provided with a no-end-no-body control of any standard or desired construction. Such controls are well known and they operate to prevent the feeding of a body upon failure of can end supply. In the present embodiment of the invention, the control of the feeding of the can bodies into the double seamer is accomplished in the first instance by an interruption of the end feed.

Referring to Figs. 9 and 10, the can ends 124 will be observed arranged in stack formation 125 above feed screws 123 which continuously rotate and receive can ends from the bottom of the stack and feed them forwardly into the double seamer in spaced relation. The end feed comprises two pivoted feed knives 119, normally pulled away from the stack by springs 119'. Cams 121 on shaft extensions 122 of the feed screws 123 periodically move the feed knives 119 in toward the stack to separate the lowermost end as it enters into the threads of the feed screws. A magnet unit is supported upon a bracket 126 and comprises a coil 127 controlling an armature 128, which is pivoted at 129 to a fixed frame part 131 and which is provided with a key head 132. The feed knives 119 have extensions 133 which engage levers 134 mounted upon pivots 135 and held in contact with said extensions 133 by means of springs 136 arranged about the pivots. Inward extensions 137 of the levers 134 have their ends arranged in adjacent relationship and move in unison with the feed knives 119. Deenergizing of magnet coil 127 permits the armature 128 to drop into the path of the inwardly moving lever extensions 137 and prevents outward movement of the feed knives under the tension of the springs 119'. This, of course, occurs when the feed knives are in their inner position and so arranged they prevent further feeding of the can ends. Viewing Fig. 10, it will be noted that during the normal operation of the can end feed, there are a number of can ends passing downwardly between the feed screws and this number is calculated to provide an end for each body in or to be received in the double seamer after the interruption of the end feed.

The magnet coil 127 is normally energized (Fig. 18) from source of electrical energy 195, through wire 194, switch 196, lamp 197 and wire 203 to coil 127, thence to ground by wire 118 and back to source of energy through wire 198. Electrical contacts are arranged in transfer runway leg 107 at 139 to close a circuit short-circuiting magnet coil 127 if the supply of can bodies ready for feeding into the double seamer fails to reach back to this point in this runway leg. A second set of contacts is arranged in transfer runway leg 141 at 143. This set of contacts is closed if the supply of cans to the tester accumulates and crowds back to this last-identified point. The two sets of contacts at 139 and 144 are arranged in parallel in a shunt, as may be readily observed at the right in Fig. 18, closing of either set of contacts short-circuiting the magnet coil 127 and holding the feed knives 119 in their inner position and interrupting the end feed. Interruption of the body feed occurs in timed relation through the no-end-no-body control mechanism incorporated in the double seamer itself.

The balance beam and contact unit at 138 for controlling the feed of can ends to the double seamer in accordance with the supply of cans back of the double seamer is, or may be, a duplicate of the balance beam and contact unit located at the point 91 back of the flanger and need not be described. The balance beam and contact unit at the point 144 is, or may be, a duplicate of the balance beam and contact unit 41 provided to interrupt the feed to the bodymaker upon excess of cans in the transfer means to the flanger and it also, therefore, need not be described.

Control of the tester

The feed to the tester is stopped under two different conditions, one of which is failure of cans back of the tester in the transfer runway formed of legs 141 and 146 and the other of which is an excess of cans in or jamming of the storage delivery runway 170. The tester has a further control stopping all of its moving parts in the event of a congestion of cans in and immediately behind the counter 171. This last control is desirable since the tester is almost always constructed to contain a large number of cans in process of testing and the runway or transfer leg 200 between the tester and counter is preferably too short in length to contain all of the cans remaining in the tester wheel at interruption of its feed.

The control for interrupting the feed to the tester will first be described, reference being had in this regard more particularly to Figs. 11 and 12 of the drawing. The cans are received into the testing pockets of the tester from a chute formed of the members 146. A bracket 149 is mounted upon the side of this chute and a lever 153 is fixed on a shaft 154 mounted in this bracket. The lever 153 is arranged to extend into the path of and be engaged by trip rods 155 arranged about the periphery of the tester wheel and to be rocked by these rods as they successively pass the free end of the lever. A spring 156 mounted in a casing 157 on the bracket presses the lever 153 over into engagement with the trip rods 155. The lever 153 is fixed upon the shaft 154 and this shaft is provided with a fixed arm 159 which is connected by a link 161 with an arm 162 fixed on a cross shaft 163 having bearing in the bracket at 164.

The shaft 163 extends over beneath the chute formed by the members 146 and there carries an arm 168 extending down the chute to adjacent the tester wheel. The free end of this arm 168 is provided with an upwardly curved end 169 adapted to be moved up into the path of can travel as each can is delivered into a turret pocket to engage and hold back the remaining cans in the chute until the next pocket is presented. It will be noted that the movement of the arm 168 is in direct coordination with the movement of the lever 153 as accomplished by the trip rods 155. It will also be noted that the arm 168 is in elevated can-restraining position when the lever 153 is in its outermost position so that if the arm 168 be held in can-restraining position, the trip rods will merely touch the lever as they pass.

The control for the tester feed comprises a magnet coil 148 mounted in the bracket 149 and governing the movement of an armature 151 pivoted at 152 to the bracket and having a down-turned end 166. While the magnet is energized, this armature is held in the elevated inoperative position, shown in dotted lines in Fig. 11. When, however, the magnet is short-circuited and deenergized, as the result of the establishment of either of the adverse conditions intended to affect the tester feed, the armature 151 drops to arrange the downward extension 166 in the path of oscillation of an arm 165 also fixed upon shaft or pivot 163 already described.

The circuit for energizing the magnet 148 (Fig. 18) comprises wire 194 leading from the source of electrical energy 195 and interposed switch 196, light 197, wire 204 to the coil 148 and thence through wire 145 through ground and wire 198 back to source. The coil is short-circuited by the closing of either contacts 147 or 167 in the manner described in connection with the previously mentioned short-circuiting wirings or shunts, it being understood that contacts 147 are closed by depletion of can storage back of the tester below the desired minimum and contacts 167 by congestion of cans in the disposal runway of the line.

The balance beam and contact unit provided at 147 is, or may be, like the balance beam and contact unit provided at the points 91 and 139 already described. The cable balance beam at 167 is of somewhat different construction and arrangement and description thereof will, therefore, be undertaken. The cans in the conveyors or runway legs back of the tester roll from point of reception to point of discharge, whereas in the conveyor or cable 170 the cans are conveyed on end, being turned at 172, and the balance beam is located to the side of the runway. The cable balance beam 167 is positioned far enough away from the tester so that when it stops the cans from feeding to the tester, there will be room in the runway for the surplus cans. For the construction and operation of said balance beam, attention is called to Figs. 16 and 17 of the drawings. A cable 173 is disposed at the bottom of a runway formed by side rails 174, which are spaced apart sufficiently so that the cans may assume the staggered relationship illustrated in Fig. 17. A rod 175 is secured at 176 to an arm 177 pivoted to one of the side rails 174. It is normally held in the runway in the position shown in Fig. 16 by means of a spring 178, secured at one end to said arm 177 and at the opposite end to an adjustably mounted hook 179 carried by a bracket 181 secured to said side rail. A contact unit, comprising a flat spring 182 and a round spring 183, is provided for operation by said rod 175, said contact members being mounted in a bracket 184 secured to one of the side rails 174. The free end of said rod 175 is bent outwardly at 185 and forwardly at 186, the extremity thereof engaging the flat spring contact 182 and holding the same against the tension thereof out of contact with the contact member 183.

The halting of the entire tester upon congestion of cans in and at the counter 171 is accomplished as follows: Referring to Fig. 13, reference character 191 indicates the manually operable lever or member provided to control the delivery of power to the tester. A bracket 189 is arranged near its upper end and a spring 193 is connected to the bracket and to an armature collar 192 mounted on the lever and normally pulls the lever in the direction to shut off the power. The magnets 188 are carried by the lever and are sufficient in power when energized to overcome the force of the spring 193 and hold the lever in power-delivery position. The tester may be started again by the operator as through movement of the lever 191 back to the starting position after congestion has been relieved or adverse condition corrected in the runway between the tester and the counter.

The magnet coils 188 receive current through a circuit as follows: wire 194 from source of electrical energy through interposed devices to wire 205, leading to the magnet coils 188, and thence back through ground and wire 198 to source. Contacts 187 are arranged in conveyor or runway leg 200 from the tester to the counter and the backing up of cans in this runway leg, through the contacts, causes them to close and short-circuit or shunt the magnet coils with resultant release of the armature 192 and movement of lever 191 under the pull of the spring 193.

Summary of operations

While it is believed that the operation of the can line control shown on the drawings and embodying the instant invention will be understood from the foregoing, attention is called to the circumstance that the various machine mechanisms or machine units, associated in the line of can making machinery and successively operating upon subject articles or can body parts or elements, have their operations interrupted or temporarily stopped in timed, nonsimultaneous relation, the stopping of the operation of each machine being controlled in accordance with its individual requirement to the production of maximum efficiency. No machine is permitted by the control to resume operation until conditions are favorable and synchronized production justifies it. As one adverse condition occurs in the line, the machine immediately affected is immediately prevented from receiving further subject articles or can body material. Interruption of this feed, of course, causes accumulation and other adverse conditions at adjacent machines and their feed is interrupted progressively as this occurs. It will be apparent also that the control permits the manual stopping of any machine without the necessity of the operator giving attention to the conditions in other machines of the line or considering the effect of the stopping of a particular machine upon their operations. The stopping of each machine creates, of course, progressive adverse conditions in the transfer machine as the operation of the other machines continues and these adverse conditions progressively interrupt the feed of subject articles or blanks to the other machines.

It is thought that the invention and many of its attendant advantages will be understood from the foregoing description, and it will be apparent that various changes may be made in the form, construction and arrangement of the parts, without departing from the spirit and scope of the invention, or sacrificing all of its material advantages, the form hereinbefore described being merely a preferred embodiment thereof.

I claim:

1. The combination of associated machines for performing operations on can bodies and the like, automatically operating transferring devices receiving partly formed can bodies and the like from a said machine and delivering them to a successively operating machine, and an electric control determining the operation of a said machine in accordance with operating conditions in a second said machine.

2. The combination of associated machines for performing operations on can bodies and the like, automatically operating transferring devices receiving partly formed can bodies and the like from a said machine and delivering them to a successively operating machine, and an electric control determinating the operation of a said machine in accordance with conditions in a second said machine and in said transfer means.

3. The combination of associated machines for performing operations on can bodies and the like, transferring devices automatically transferring the partly formed can bodies and the like from a said machine to a later operating one, and an electric control terminating the operation of the earlier operating machine after termination of the operation of the later operating machine and the provision by the earlier operating machine of a predetermined number of can bodies and the like in said transfer means.

4. The combination of a plurality of machines successively operating to produce can parts, means for feeding tin articles to the prior operating of said machines, means for transferring the product of the prior operating machine to the later operating machine, and means operated by an excess of said product on said transferring means and connected with the said feeding means for stopping the operation of the latter.

5. In a line of can making machinery the combination of a plurality of machines adapted to successively perform a can making operation upon can body material, associated conveyors automatically transferring the partly made cans from each said machine to the next in said line, and electric means controlled by predetermined conditions in said conveyors for interrupting the action of said machines because of and throughout the duration of a said predetermined condition in said conveyor.

6. In combination, a machine for performing an operation for the making of articles, and the like, a guideway for the articles operated upon by said machine, and electric means controlled by predetermined conditions in the guideway for automatically stopping the operation of the machine, said electric means starting said machine again upon correction of said conditions.

7. In combination, successively operating machines for producing can bodies, and the like, transfer means automatically delivering bodies in the process of formation from a said machine to a second said machine, and an electric control governing the operation of said first mentioned machine in accordance with the number of bodies in said transfer means.

8. The combination of a machine for performing an operation upon a can body, and the like, means feeding subject articles to said machine, means delivering subject articles from said machine, and an electric control for rendering said machine inoperative upon creation of predetermined conditions in said delivery means and upon different predetermined conditions in said feeding means.

9. In a can making machine, the combination of a plurality of mechanisms for performing successive stages of manufacture of cans, individual means for guiding and delivering to a mechanism for its operation thereon, can elements which have been operated on by a preceding mechanism, and means actuated by the can elements in each individual guiding means for controlling the number of can elements passing along a preceding guiding means.

10. The combination of a machine for operating upon can bodies and the like, a device delivering can bodies to said machine to be operated upon, means transferring can bodies from said machine after operation thereon, and an electric control operable to render said machine inoperative by means of a predetermined number of bodies in said delivery device and maintaining said machine inoperative until termination of said condition and also until said machine is in position and condition to resume operation.

11. The combination of a machine for operating upon can bodies and the like, a device delivering can bodies to said machine to be operated upon, means transferring can bodies from said machine after operation thereon, and an electric control for interrupting the operation of said machine by means of a predetermined number of bodies in said delivery device and said transfer means, said control operating to maintain said machine inoperative until said conditions are terminated and the machine is in position and condition to resume operation.

12. In can making machinery the combination of first and second mechanism for performing successive stages of manufacture of cans, means for guiding and delivering to the second mechanism for its operation thereon can elements operated on and delivered by the first mechanism, and means actuated by can elements in said guiding means not delivered to said second mechanism for lessening the operations of said first mechanism.

13. The combination of a plurality of machines successively operating upon can parts to produce a can body, feeding means individualized to said machines, transfer means for transferring the can bodies from each machine to the feeding means of the next successively operating machine, and a control for interrupting the action of the several feeding means upon establishment of adverse conditions in said transfer means, the while permitting continued operation of said machine.

14. The combination of a plurality of machines successively operating to produce can bodies, means for transferring partly formed can bodies successively through said machines, and a control individually governing the operation of each said machine in accordance with conditions in said transfer means, said control permitting said machines to complete operations upon can bodies in said machines and independently of adverse conditions in said transfer means.

15. The combination of a plurality of machines successively operating to produce can bodies, feeding means for said machines, transfer means for transferring can bodies successively to said machines, and a control for interrupting the feeding means of said machines individually and in accordance with conditions in said transfer means, said transfer means being adapted to receive can bodies in said machines after interruption of said feeding means by said control.

16. In a line of can making machinery, the combination of a plurality of machines adapted to successively perform a can making operation upon can making material, means feeding a blank to the first of said machines and thence successively through them, means feeding a blank to one of the later operating machines, and a control for governing the operation of the earlier operating machines in accordance with the feeding conditions of said second mentioned blank feeding means.

17. In a line of can making machinery, the combination of a plurality of machines adapted to successively perform a can making operation upon can making material, means feeding a body blank to the first of said machines and thence successively through them, means feeding a can end to one of the later operating machines, and a control for governing the operation of the earlier operating machines in accordance with the feeding conditions of the can end feeding means.

18. The combination of a plurality of machines successively operating to produce can bodies, a said machine having a manually operable member for starting and stopping it, transfer means successively presenting the partially formed can body to said machine, and a control for interrupting the operation of other machines of said plurality of machines upon manipulation of said member to interrupt the operation of said machine.

19. The combination of a plurality of machines successively operating to produce can bodies, a said machine having a manually operable member for starting and stopping it, transfer means successively presenting the partially formed can body to said machine, and a control for interrupting the operation of other machines of said plurality of machines upon manipulation of said member interrupt the operation of said machine, said control interrupting the operation of said other machines in timed nonsimultaneous relation to the interruption of said machine.

20. The combination of a plurality of machines successively operating to produce can bodies, a said machine having a manually operable member for starting and stopping it, transfer means successively presenting the partially formed can body to said machine, and a control for interrupting the operation of other machines of said plurality of machines upon manipulation of said member to interrupt the operation of said machine, said control terminating said interruption upon starting of said machine.

21. The combination of a plurality of machines successively operating to produce can bodies, a said machine having a manually operable member for starting and stopping it, transfer means successively presenting the partially formed can body to said machine, and a control for interrupting the operation of other machines of said plurality of machines upon manipulation of said member to interrupt the operation of said machine, said control terminating said interruption upon starting of said machine, and in timed nonsimultaneous relation thereto.

22. The combination of a plurality of machines successively operating to produce can bodies, means transferring can bodies successively to said machines, and a control governing the action of said machines in accordance with conditions created in said transfer means, said control successively altering the action of said machines and as the creation of one adverse condition in said transfer means results in creation of other adverse conditions.

23. In a line of can making machines, the combination of a plurality of machines adapted to successively perform a can making operation upon can making material, means feeding a body blank to the first of said machines and then successively through them, a control for said line of can making machines operable upon creation of adverse feeding conditions in said line to progressively interrupt operations of earlier operating machines.

24. In a line of can making machinery, the combination of a bodymaker, means for feeding blanks into said bodymaker, a guideway for the can bodies leaving said bodymaker, and means operable by a predetermined number of bodies in said guideway for automatically preventing the operation of said blank feeding means.

25. In a line of can making machinery, the combination of a bodymaker, means for feeding blanks into said bodymaker, a guideway for the can bodies leaving said bodymaker, and electric means operable by a predetermined number of bodies in said guideway for automatically preventing the operation of said blank feeding means.

26. In a line of can making machinery, the combination of a body flanger, a guideway for the articles to be operated upon by the flanger, and means operable by the absence of a predetermined number of articles in said guideway for automatically preventing the feeding of bodies into said flanger.

27. In a line of can making machinery, the combination of a body flanger, a guideway for the articles to be operated upon by the flanger, and electric means operable by the absence of a predetermined number of articles in said guideway for automatically preventing the feeding of bodies into said flanger.

28. In a line of can making machinery, the combination of a double seamer, a guideway for the articles to be operated upon by the double seamer, and means operable by the absence of a predetermined number of articles in said guideway for automatically preventing the feeding of bodies into said double seamer.

29. In a line of can making machinery, the combination of a double seamer, a guideway for the articles to be operated upon by the double seamer, and electric means operable by the absence of a predetermined number of articles in said guideway for automatically preventing the feeding of bodies into said double seamer.

30. In a line of can making machinery, the combination of a tester, a guideway for the articles to be operated upon by the tester, and means operable by the absence of a predetermined number of articles in said guideway for automatically preventing the feeding of bodies into said tester.

31. In a line of can making machinery, the combination of a tester, a guideway for the articles to be operated upon by the tester, and electric means operable by the absence of a predetermined number of articles in said guideway for automatically preventing the feeding of bodies into said tester.

32. In a line of can making machinery, the combination of a tester, a guideway for the articles which have been operated upon by the tester, and electric means operable by a predetermined number of cans in said guideway for stopping the operation of the tester.

33. The combination of a can body maker and a can body flanger, means for feeding blanks to said bodymaker, means for transferring made can bodies to said flanger, and means operated by excess of can bodies on said transferring means and connected with the said feeding means for stopping the operation of the latter.

34. The combination of a can bodymaker and a can body flanger, suction means for feeding blanks to said bodymaker, means for transferring made can bodies to said flanger, and means operated by excess of can bodies on said transferring means and connected with the said suction feeding means for stopping the operation of the latter.

35. In can making machinery, the combination of a bodymaking mechanism, soldering means receiving bodies from said mechanism, means for feeding blanks to said mechanism, a guideway for soldered can bodies leading from said soldering means, a control for said feeding means, and means operated by excess of can bodies on said guideway for actuating said control to stop the said feeding means, leaving the said mechanism and soldering means in operation.

36. The combination of a can body flanger and a can body double seamer, means for feeding bodies to said flanger, means for transferring flanged bodies to said double seamer, and means operated by an excess of can bodies on said transferring means and connected with the said feeding means for stopping the operation of the latter.

37. The combination of a can body double seamer and a can body tester, means for feeding cans to said can body double seamer, means for transferring cans to said tester, and means operated by an excess of cans on said transferring means and connected with said feeding means for stopping the operation of the latter.

LYMAN L. JONES.